United States Patent
Herkes et al.

(10) Patent No.: US 8,311,686 B2
(45) Date of Patent: Nov. 13, 2012

(54) ONBOARD AIRPLANE COMMUNITY NOISE AND EMISSIONS MONITOR

(75) Inventors: William H. Herkes, Seattle, WA (US); Kevin A. Burnside, Renton, WA (US); Ronald F. Olsen, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 556 days.

(21) Appl. No.: 12/544,321

(22) Filed: Aug. 20, 2009

(65) Prior Publication Data

US 2011/0046818 A1  Feb. 24, 2011

(51) Int. Cl.
  B64D 43/00    (2006.01)
  G06F 17/00    (2006.01)
(52) U.S. Cl. .......... 701/3; 701/10; 701/14; 342/451; 340/971
(58) Field of Classification Search ............. 701/3, 10, 701/8, 14; 342/451; 340/971
  See application file for complete search history.

(56) References Cited

U.S. PATENT DOCUMENTS

| 2001/0026252 | A1* | 10/2001 | Shibata et al. ............. 345/60 |
| 2005/0098681 | A1 | 5/2005 | Berson et al. |
| 2006/0111818 | A1 | 5/2006 | Ishii et al. |
| 2006/0191326 | A1 | 8/2006 | Smith et al. |
| 2007/0069950 | A1* | 3/2007 | Smith et al. ............. 342/456 |
| 2009/0002939 | A1* | 1/2009 | Baugh et al. ............. 361/687 |
| 2009/0140924 | A1* | 6/2009 | Mizuochi et al. ......... 342/451 |
| 2009/0265049 | A1* | 10/2009 | Wise et al. .............. 701/3 |

FOREIGN PATENT DOCUMENTS

| EP | 2 124 121 A2 | 11/2009 |
| JP | 2007-314180 A | 12/2007 |

OTHER PUBLICATIONS

Eurpean Patent Office, European Search Report for European Patent Application No. 10251459.3-1232/2287822 dated Dec. 21, 2011.
"WebTrack: Seattle—Tacoma International Airport—Mozilla Firefox." http://sea.webtrack-lochard.com/template/index.html. 2003 Microsoft Corp.
EPA: "Measurement and Monitoring Technologies for the 21st Century [21M2]: Open Path Technologies: Measurement at a Distance." http://cluin.org/programs/21m2/openpath/lidar/.
"Noise Model Simulation NMSIM" http://www.wylelabs.com/products/acousticsoftwareproducts/nmsim.html.
Federal Aviation Administration: "Integrated Noise Model (INM): What is INM Designed to Do?" http://www.faa.gov/about/office_org/headquarters_offices/aep/models/inm_model/.
Federal Aviation Administration: "Emissions and Dispersion Modeling System (EDMS): What is EDMS Designed to Do?" http://www.faa.gov/about/office_org/headquarters_offices/aep/models/edms_model/.

* cited by examiner

*Primary Examiner* — Tan Q Nguyen
(74) *Attorney, Agent, or Firm* — Charles L. Moore; Moore & Van Allen PLLC

(57) ABSTRACT

A method for monitoring airplane noise and emissions may include receiving a predetermined set of engine performance data for an airplane and receiving a predetermined set of airplane flight data for the airplane. The method may also include predicting at least one of a noise level and an emissions level from the airplane at each of a plurality of ground based noise and emissions monitoring stations based on the predetermined set of engine performance data and the predetermined set of airplane flight data. Each of the plurality of ground based noise and emissions monitoring stations is located at a predetermined geographic location along an expected flight path of the airplane. The method may also include presenting at least one of the predicted noise level and the predicted emissions level on a display to a pilot of the airplane to permit operation of the airplane to substantially minimize at least one of an actual noise level and an actual emissions level at each of the plurality of ground based noise and emissions monitoring stations.

17 Claims, 7 Drawing Sheets

ONBOARD AIRPLANE COMMUNITY NOISE AND EMISSIONS MONITOR

FIELD

The present disclosure relates to aerospace vehicles or aircraft, and more particularly to an airplane community noise and emissions monitor and method.

BACKGROUND

Noise and emissions from the takeoff and landing operations of aircraft can have an impact on communities surrounding airports. Airplane flight variables associated with takeoff and landing operations, such as airplane weight, engine power settings, wing flap positions, weather conditions, flight speed, and flight path can influence the noise and emissions generated by an airplane and impact the communities surrounding airports. For landing operations, continuous descent approach, reduced landing flap, displaced threshold and increased final approach angle procedures are being adopted by some airports and airlines to reduce both noise and emissions for surrounding communities. For takeoff operations, noise-optimal flaps, takeoff climb improvement by overspeed on the runway and cutback power procedures are often used to reduce the community noise impact. Some airports provide "real-time" flight track and noise information on public websites that combine local radar tracking with noise measurements into a single source of aircraft position and their resulting noise levels, but this information is not available to the flight crew. The information is also measurement-based or only available after the flight event instead of being predictive, which reduces or eliminates the opportunities for noise and emissions reduction. There currently is no predictive or real-time feedback to pilots on the flightdeck as to the effectiveness of any noise and emission abatement or reduction procedures that may be utilized for a specific set of conditions and desired operational settings.

SUMMARY

In accordance with an embodiment, a method for monitoring airplane noise and emissions may include receiving a predetermined set of engine performance data for an airplane and receiving a predetermined set of airplane flight data for the airplane. The method may also include predicting at least one of a noise level and an emissions level from the airplane at each of a plurality of ground based noise and emissions monitoring stations based on the predetermined set of engine performance data and the predetermined set of airplane flight data. Each of the plurality of ground based noise and emissions monitoring stations is located at a predetermined geographic location along an expected flight path of the airplane. The method may also include presenting at least one of the predicted noise level and the predicted emissions level on a display to a pilot of the airplane to permit operation of the airplane to substantially minimize at least one of an actual noise level and an actual emissions level at each of the plurality of ground based noise and emissions monitoring stations.

In accordance with another embodiment, a system for monitoring airplane noise and emissions may include a computer system mountable on an airplane. The computer system may be adapted to receive a predetermined set of engine performance data and a predetermined set of airplane flight data for the airplane. The computer system may be further adapted to predict at least one of a noise level and an emissions level from the airplane at each of a plurality of ground based noise and emissions monitoring stations based on the predetermined set of engine performance data and the predetermined set of airplane flight data. Each of the plurality of ground based noise and emissions monitoring stations is located at a predetermined geographic location along an expected flight path of the airplane. The system may also include a display to selectively present at least one of the predicted noise level and the predicted emissions level to a pilot of the airplane to permit operation of the airplane to substantially minimize at least one of an actual noise level and an actual emissions level at each of the plurality of ground based noise and emissions monitoring stations.

In accordance with another embodiment, a computer program product for monitoring airplane noise and emissions may include a computer readable storage medium having computer readable program code embodied therewith, the computer readable program code may include computer readable program code configured to receive a predetermined set of engine performance data for an airplane and computer readable program code configured to receive a predetermined set of airplane flight data for the airplane. The computer readable program code may also include computer readable program code configured to predict at least one of a noise level and an emissions level from the airplane at each of a plurality of ground based noise and emissions monitoring stations based on the predetermined set of engine performance data and the predetermined set of airplane flight data. Each of the plurality of ground based noise and emissions monitoring stations is located at a predetermined geographic location along an expected flight path of the airplane. The computer readable program code may also include computer readable program code configured to present at least one of the predicted noise level and the predicted emissions level on a display to a pilot of the airplane to permit operation of the airplane to substantially minimize at least one of an actual noise level and an actual emissions level at each of the plurality of ground based noise and emissions monitoring stations.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

DESCRIPTION

Figure 1:
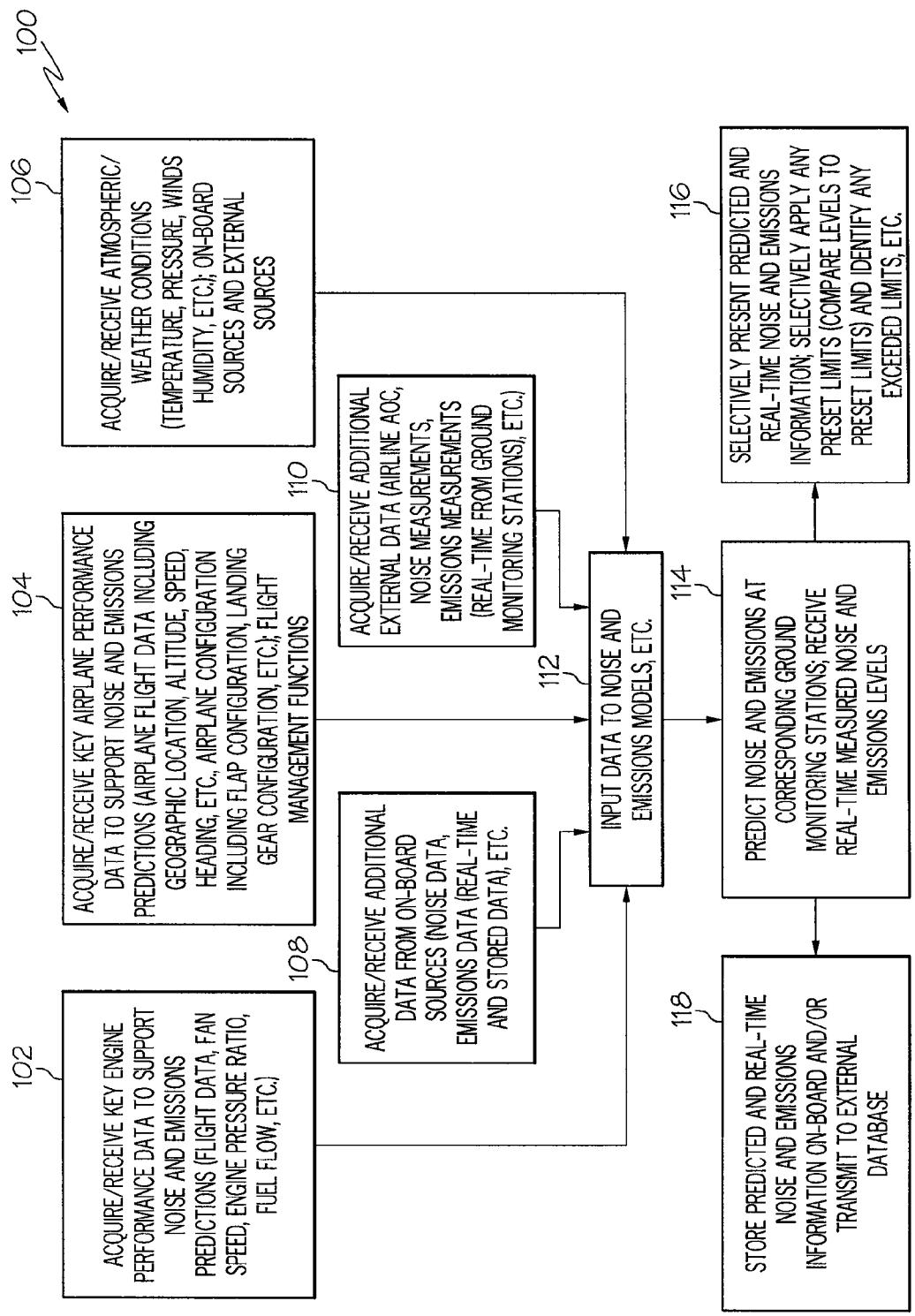
FIG. 1 is a flow chart of an example of a method for monitoring airplane noise and emissions in accordance with an embodiment of the present disclosure.

The following detailed description of embodiments refers to the accompanying drawings, which illustrate specific embodiments of the disclosure. Other embodiments having different structures and operations do not depart from the scope of the present disclosure.

As will be appreciated by one of skill in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flow chart of an example of a method 100 for monitoring airplane noise and emissions in accordance with an embodiment of the present disclosure. In block 102, a predetermined set of engine performance data or key engine performance data may be acquired or received by a noise and emissions monitor or monitoring system that may be used to support predicting or forecasting noise and emissions levels generated by the airplane. Examples of the predetermined set of engine performance data may include flight data, fan speed, engine pressure ratio, fuel flow, operating and exhaust gas temperatures, and any other data or parameters that may be useful in predicting noise and emission levels.

In block 104, a predetermined set of airplane flight performance data or key flight data to support predicting or forecasting noise and emissions levels of the airplane may be received or acquired by the noise and emissions monitor or monitoring system. Examples of the predetermined set of airplane flight data may include geographic location, altitude, airspeed, heading, airplane configuration including flap configuration, landing gear configuration and any other data or parameters that may be useful in predicting noise and emissions levels.

As described in more detail with reference to FIG. 2, the noise and emissions monitor or system may interface with the airplane's Flight Management Computer (FMC) to acquire key airplane and engine performance parameters to support the noise and emissions predictions within the noise and emissions monitor or system. In accordance with an embodiment, relevant data that are currently available by way of the Aeronautical Radio Incorporated (ARINC) 828 Electronic Flight Bag (EFB) protocol may be communicated to the noise and emissions monitor for use in predicting the noise and emissions levels. The noise and emissions monitor or system may provide feedback to the FMC if desired to improve operation of the airplane with respect to noise and emissions levels generated by the airplane.

Electronic Flight Bag (EFB) is an electronic information management device that may be provided onboard an airplane to assist flight crews in performing flight management tasks more easily and efficiently. The EFB may be a general purpose computer or computing platform intended to reduce, or replace, paper-based reference material formerly contained in a pilot's carry-on flight bag. Such materials may have included aircraft operating manual, aircrew operating manual, navigation charts including maps for air and ground operations and other materials for flight operations. The EFB includes electronic moving maps for ground and air operations. An example of an EFB is illustrated in FIGS. 3-7 including an example of an electronic moving map in FIG. 7. In addition, the EFB can host software applications for specific purposes to automate other operations normally or formerly conducted manually by the pilot, such as performing take-off calculations and other flight related tasks.

In block 106, atmospheric or weather conditions or data may be received or acquired. Examples of such atmospheric conditions or data may include temperature, barometric pressure, humidity, wind field information, and any other atmospheric or weather conditions or data that may be useful in predicting noise and emissions levels that may be generated by the airplane. The atmospheric and weather conditions or data may be received or acquired from onboard sources and external sources, such as ground based monitoring stations, Internet or web-based sources or other sources.

In block 108, additional data may be acquired from onboard sources or a database. Examples of such data may include stored noise and emissions historical data or other data that may be useful in predicting noise and emissions levels as described herein. The onboard historical predictions and actual measurements may be used to improve the onboard prediction capability of the noise and emissions monitor or system or other prediction routines or models.

In block 110, additional external data or information useful in predicting noise and emissions levels may be received or acquired. For example, web-based noise and emissions reporting sites may be accessed to obtain real-time or near real-time noise and emissions information recorded by airports. Web-based data streams could be accessed using existing communication protocols, such as satellite communications or other communications technologies or protocols. The noise and emissions data from such web-based sources or other sources may be presented to the pilot as described herein to provide substantially real-time or near real-time feedback on environmental performance and conditions.

In block 112, the different acquired or received data in blocks 102-110 may be used in noise and emissions models. As described in more detail below, the noise and emissions models may be mathematical algorithms or representations stored in association with a computer system or other data processing device and capable of running thereon for determining the noise and emissions at selected locations based on the input parameters or variables as described herein. In block 114, noise and emissions levels from the airplane may be predicted at each of a plurality of ground based noise and emissions monitoring stations based on the input data. As described in more detail herein, each of the ground based noise and emissions monitoring stations may be located at a predetermined geographical location along an expected flight path of the airplane. A noise or emissions area intensity field may be estimated from a sufficiently large number of discrete noise or emission prediction or monitoring sites. Iso-contours of noise or emissions, commonly referred to as "footprints or contours" may be generated from the intensity field information. Emissions may be calculated as total quantities released, commonly referred to as an emissions inventory, or estimated at a location after dispersion.

In block 114, a forecasting algorithm may predict peak noise levels at all airport noise monitor locations based on a current hypothetical, expected or intended airplane flight path heading, engine power setting, flight speed, flap configuration, weather conditions, and any other parameters useful in predicting noise levels. As the pilot makes changes to the flight profile, or any other changes, the forecasting algorithm may react to those changes through a flight management computer or other means and provide updated forecasts or predictions. The method 100 or system may predict different noise levels and emissions levels at the different ground based monitoring stations based on different parameters as described above being entered by the pilot and the prediction results may present to the pilot as described herein to assist the pilot in selecting the best or optimum flight path, engine settings, airplane configuration, and any other parameter settings.

The noise and emissions monitor or system predictions may be based on math models, algorithms or similar mathematical representations which are semi-empirical in nature for computational speed and accuracy. Both the emissions and noise models may be based on measured data that has been correlated with key parameters of the engine and airplane operation. Emissions data acquired from engine test cell data and flight test data may be correlated with relevant engine operating parameters and the relevant airplane operating parameters to project current local air quality pollutants and $CO_2$ emissions. In a somewhat similar fashion, noise data acquired from flight and ground test databases may be developed into relevant noise component models that are correlated with the relevant airplane and engine operating parameters.

Engine related turbo machinery, jet, core, and airplane installation and airframe noise source emissions differ in their parameter correlations with each having their own unique sub-component noise characteristic and resulting math model. The noise and emissions software or module uses high speed algorithms to perform real time synthesis of the sub component spectrums and projects or calculates the resulting noise and emission impact on the ground. The prediction can include the effects of weather and terrain to improve the prediction of various noise metrics at a given ground location.

There are several available noise prediction and emission prediction models or algorithms. One developed by the Federal Aviation Administration (FAA) is the Integrated Noise Model (INM). The INM is based on algorithms and framework outlined in the Society of Automotive Engineers (SAE) Aerospace Report "Procedure for the Calculation of Airplane Noise in the Vicinity of Airports" (AIR-1845). Another example of a noise prediction model is the Noise Model Simulation NMSIM as provide by Wyle Research and Consulting of Arlington, Va. An example of an emissions prediction model is the Emissions and Dispersion Modeling System (EDMS) available through the FAA. The International Civil Aviation Organization (ICAO) also maintains an Aircraft Engine Emissions Databank and database of Individual Engine Datasheets.

In block 114, the noise and emissions monitor or system may also receive real-time or near real-time actual measured noise levels and real-time or near real-time actual measured emissions levels created by the airplane for each of the plurality of ground based noise and emissions monitoring stations as the airplane proceeds along an actual flight path.

In block 116, the predicted noise level and the predicted emissions level may be presented on a display to the pilot of the airplane to permit operation of the airplane to substantially minimize an actual noise and an actual emissions level at each of the plurality of ground based noise and emissions monitoring stations based on the flight profile and other engine and airplane parameters entered by the pilot to predict the noise and emissions levels. Similar to that previously discussed, the pilot may enter different scenarios to provide different noise level predictions and emissions level predictions. The pilot may then select the best or optimum flight path, engine settings, airplane configuration settings, and any other parameter settings to substantially minimize the actual noise and emissions levels at the different ground based monitoring stations.

The real-time or near real-time actual measured noise level and the real-time or near real-time actual measured emissions level for each of the plurality of ground based noise and emissions monitoring stations may also be presented on the display. In accordance with an embodiment, an option may be provided for the pilot to selectively present on the display any one of or a combination of the predicted noise level, the predicted emissions level, the real-time or near real time actual measured noise level, and the real-time or near real-time actual measured emissions level at each of the ground based noise and emissions monitoring stations. An option may also be provided to present the noise and emission levels in a chosen format. The chosen format may include a graphical format or a tabular format. Examples of different types of chosen formats and types of information that may be presented on the display will be described with reference to FIGS. 3-6.

In block 116 any preset noise limits for each of the ground based noise and emissions monitoring station may be applied to the predicted noise or real-time or near real-time actual measured noise level for each station. Any preset noise limits may be applied by comparing the predicted noise levels or actual measured noise levels to at least one preset noise limit for each of the ground based noise and emissions monitoring stations in response to the pilot selecting an option to apply limits to the predicted or measured noise levels. Any predicted noise level or emissions level or actual measured noise level that exceeds the at least one preset noise limit may be identified or highlighted on the display. For example noise levels that exceed the preset noise limit may be shown in a red color or in a red colored box or balloon, or identified in some other intuitive manner to provide notice to the pilot. Any predicted or actual measured noise levels with a cautionary range close to the preset limit may be shown in a yellow color or some other identifying manner for immediate recognition or awareness by the pilot. And any predicted or actual measured noise levels below the preset limit and/or cautionary zone may be shown in a green color or green box or balloon on the display.

Similarly, any preset limits may be applied to the predicted emissions levels and the actual measured emissions levels. Each of the predicted emissions levels and/or actual measured emissions levels may be compared to at least one preset emissions limit for each of the ground based noise and emissions monitoring stations in response to the pilot selecting an option to apply limits to the predicted or measured emissions levels. Any predicted emissions level or measured emissions level that exceeds the at least one preset emissions limit may be identified or highlighted for easy recognition or awareness by the pilot.

The real-time or near real-time actual measured noise level and emissions level may be continually updated for each of the plurality of ground based noise and emissions monitoring stations as the airplane proceeds along the actual flight path.

In block 118, the predicted noise levels, the actual measured noise levels, the predicted emissions levels and actual measured emissions levels or any combination of these noise and emissions levels for each of the ground based noise and emissions monitoring station may be stored in a storage device onboard the airplane. Alternatively, or additionally, the predicted noise levels, the actual measured noise levels, the predicted emissions levels and actual measured emissions levels or any combination of these noise and emissions levels for each of the ground based noise and emissions monitoring station may be transmitted to a ground station for storage in an external database. The data may be used for noise or emissions compliance purposes, inventories for statistical analysis or for other purposes.

Figure 2:
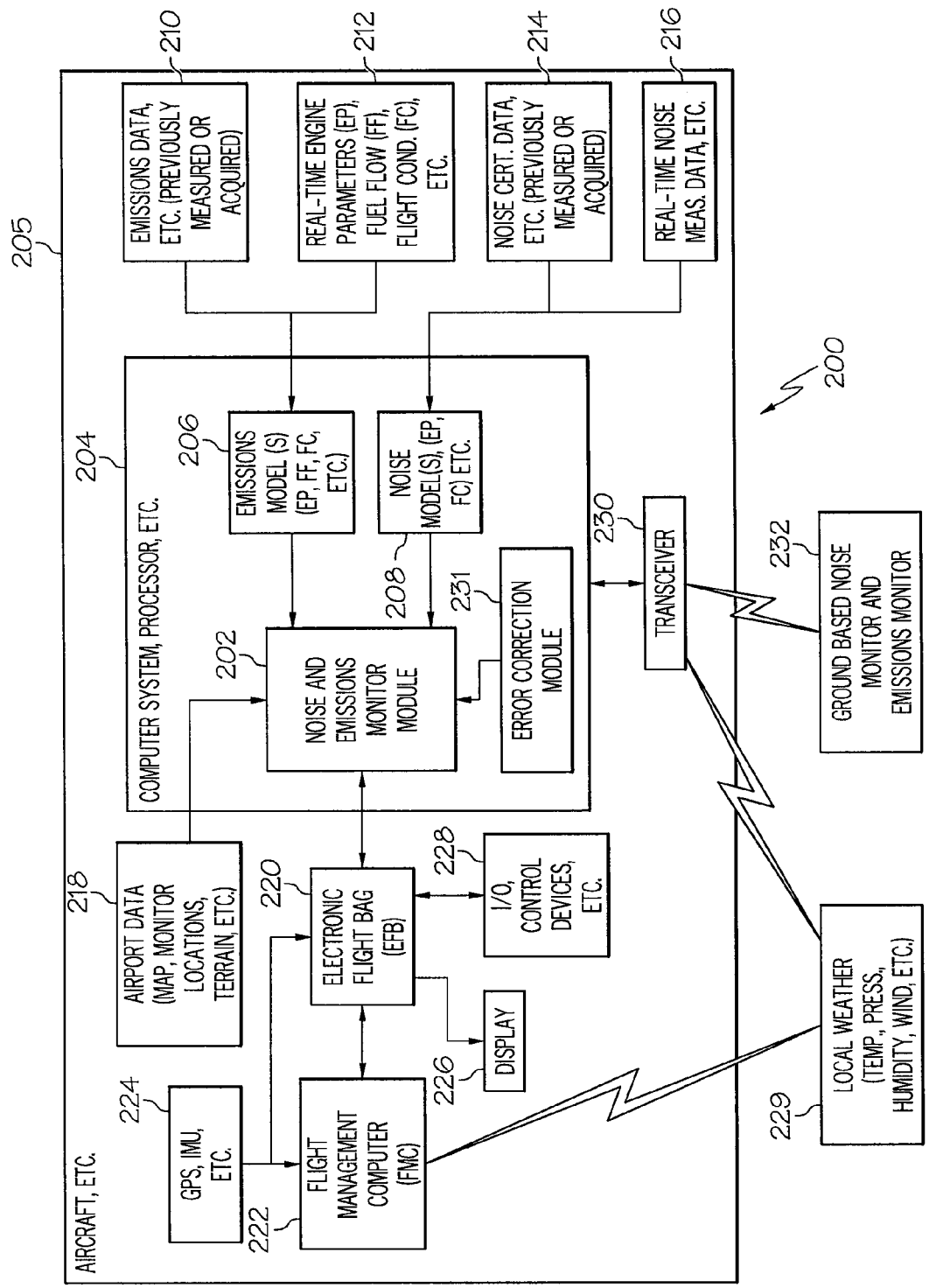
FIG. 2 is a block diagram of an exemplary system for monitoring airplane noise and emissions in accordance with an embodiment of the present disclosure.

FIG. 2 is a block diagram of an exemplary system 200 for monitoring airplane noise and emissions in accordance with an embodiment of the present disclosure. The method 100 may be embodied in the system 200. The system 200 may include a noise and emissions monitor module 202. The noise and emissions monitor module 202 may be stored on and/or operable on a computer system 204 or processor. Some or all of the features of the method 100 may be embodied in and performed by the noise and emissions module 202. The computer system 204 may be disposed or mounted in an aircraft 205.

An emissions model 206 and a noise model 208 may also be operable on the computer system 204. The emissions model 206 and noise model 208 may be similar to those previously described. The emissions model 206 may determine or model emissions based on engine parameters or engine data. The emissions model 206 may determine nitrogen oxide ($NO_X$) levels, sulfur oxide ($SO_X$), particulate matter ($PM_{XX}$), carbon dioxide $CO_2$ levels or other pollutants and emissions as a function of engine parameters such as fuel flow, airspeed, fan speed, engine pressure ratio, operating and exhaust gas temperatures, and other parameters. The emissions model 206 may receive emissions data and other supporting measurements 210. The emissions data and other supporting measurements 210 may include previously predicted emissions levels and previously measured emissions levels. The emissions data may be received from onboard sources or from external source, such as web-based sources similar to that previously described. The emissions model 206 may also receive real-time engine parameters 212 and other real-time data as previously discussed.

The noise model 208 may be a three dimensional noise model similar to those previously discussed. The noise model 208 may receive noise certification data or similar data 214 and real-time noise measurement data or the like 216.

Results from the emissions model or models 206 and the noise model or models 208 may then be transmitted or provided to the noise and emissions monitor module 202 to predict noise and emissions levels along a flight path of the airplane similar to that previously described.

The noise and emissions monitor module 202 may also receive airport data 218 from a database. The airport data 218 may include a map of the geographic area surrounding the airport, locations of noise and emissions monitoring stations, terrain as well as other information or data that my be useful in predicting the noise and emissions level generated by the airplane 205 as it flies along its intended flight path.

The noise and emissions monitor module 202 may also interface with, or may be hosted by an electronic flight bag (EFB) 220 similar to that previously described. The EFB may be coupled to a flight management computer (FMC) 222. The FMC 222 and EFB 220 may provide key airplane and engine performance parameters to the noise and emissions monitor 202 to support noise and emissions predictions and noise and emissions monitoring as described herein.

A global position system (GPS) 224, inertial measuring unit (IMU) or other device may provide geographic location information to the FMC 222 and EFB 220 for use in predicting and monitoring the noise and emissions generated by the airplane 205.

A display 226 and control devices or means 228 may be associated with the EFB 220 or a separate display and controls may be associated with the noise and control monitor module 202 for presenting the noise and emissions levels as described herein.

A transceiver 230 may be coupled to the computer system 204 for receiving real-time or near real-time noise and emissions data from the ground based noise and emissions monitoring stations 232. There may be separate ground based noise monitoring stations and ground base emissions monitoring stations or there may be combination ground based noise and emissions monitoring stations. The transceiver may also receive local weather or atmospheric information for use in the noise and emissions predictions. The transceiver 230 may also be used to access external information, such as web-based information or data streams for providing noise and emissions awareness information to the pilot. The transceiver 230 may additionally receive local weather data 229 for use in predicting noise and emissions levels.

The transceiver 230 may also transmit or report out the predicted noise and emissions levels to a ground station for storage in a database to improve noise and emission inventories at airports, for compliance purposes, for use by environmental agencies or for other purposes.

The system 200 or noise and emissions monitor may also include an error correction module 231 or feature for the forecasting or predicting algorithm in the noise and emissions monitor module 202 based on direct comparisons with an airport's ground based monitor systems located within the community. The corrected forecasting functionality may allow for aircraft-specific predictions that correctly account for wear, dedicated routing or other factors that may add to prediction uncertainty. The noise and emissions monitor or system 200 may continually display the noise levels being observed on the ground at all key noise monitor stations 232 as well as forecasted peak noise events. Over time, using statistical methods, the algorithms of the monitor may be able to improve the accuracy of noise forecasting or predicting peak noise events at all ground based noise monitoring stations 232 or locations. This is a learning feature of the monitor or system 200.

The noise and emissions monitor or system 200 may be adapted to provide a variety of displays for the flight deck and pilot, especially in the area of situational awareness concerning the airplanes impact on community noise and emissions. FIGS. 3-6 illustrate non-limiting examples of a series of screen displays. Controls, such as controls 228 may be provided for the pilot to select between the different display options illustrated in FIGS. 3-6 and to select different features of the noise and emissions monitor or system 200.

Figure 3:
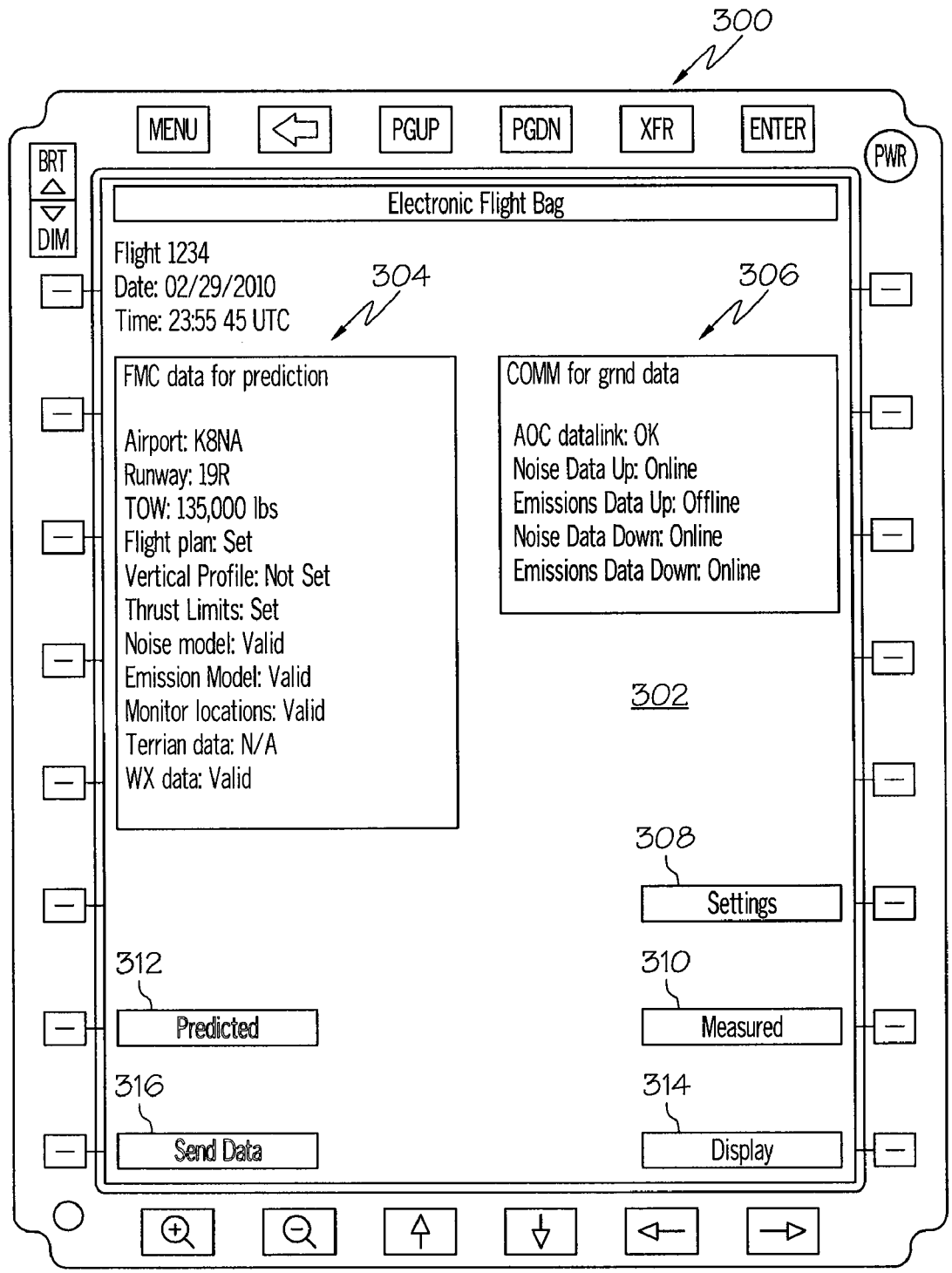
FIG. 3 is an illustration of an exemplary display presenting a main window or interface to a pilot for controlling the system for monitoring airplane noise and emissions in accordance with an embodiment of the present disclosure.

FIG. 3 is an illustration of an exemplary display 300 presenting a main window 302 or interface to a pilot for controlling the system for monitoring airplane noise and emissions in accordance with an embodiment of the present disclosure The display 300 may represent an electronic flight bag (EFB). The main window 302 may provide system status and allow for navigation to other pages of the EFB for controlling the system. The implementation may use a touch screen, pointing device, soft keys or other means of navigating through the selections on any given page. Additionally, the main window may present data from the flight management computer (FMC) for predicting noise and emissions levels in a table 304. In another table 306, the communications links for receiving data from ground sources may be presented along with the corresponding status of each link. The status may be color coded or otherwise distinguished or highlighted for easy recognition or awareness of the pilot. For example, the status for any link that is not operating or offline may be presented by the term "Offline" in the color red. The status of any active or online link may be represented by the term "OK" or "Online" in the color green.

The display 300 may also include soft keys or other means for controlling the system and presenting different displays. Examples of soft keys may include a "Settings" soft key 308 which may be activated to present a settings page similar to that illustrated in FIG. 4; a "Measured" soft key 310 to present measured noise and emissions data similar to that illustrated in FIG. 5; a "Predicted" soft key 312 to present predicted noise and emissions data similar to that illustrated in FIG. 6; and a "Display" soft key 314 to present a map similar to that illustrated in FIG. 7. A "Send Data" soft key 316 may also be provided to transmit any noise and emissions data to an external database similar to that described herein.

Figure 4:
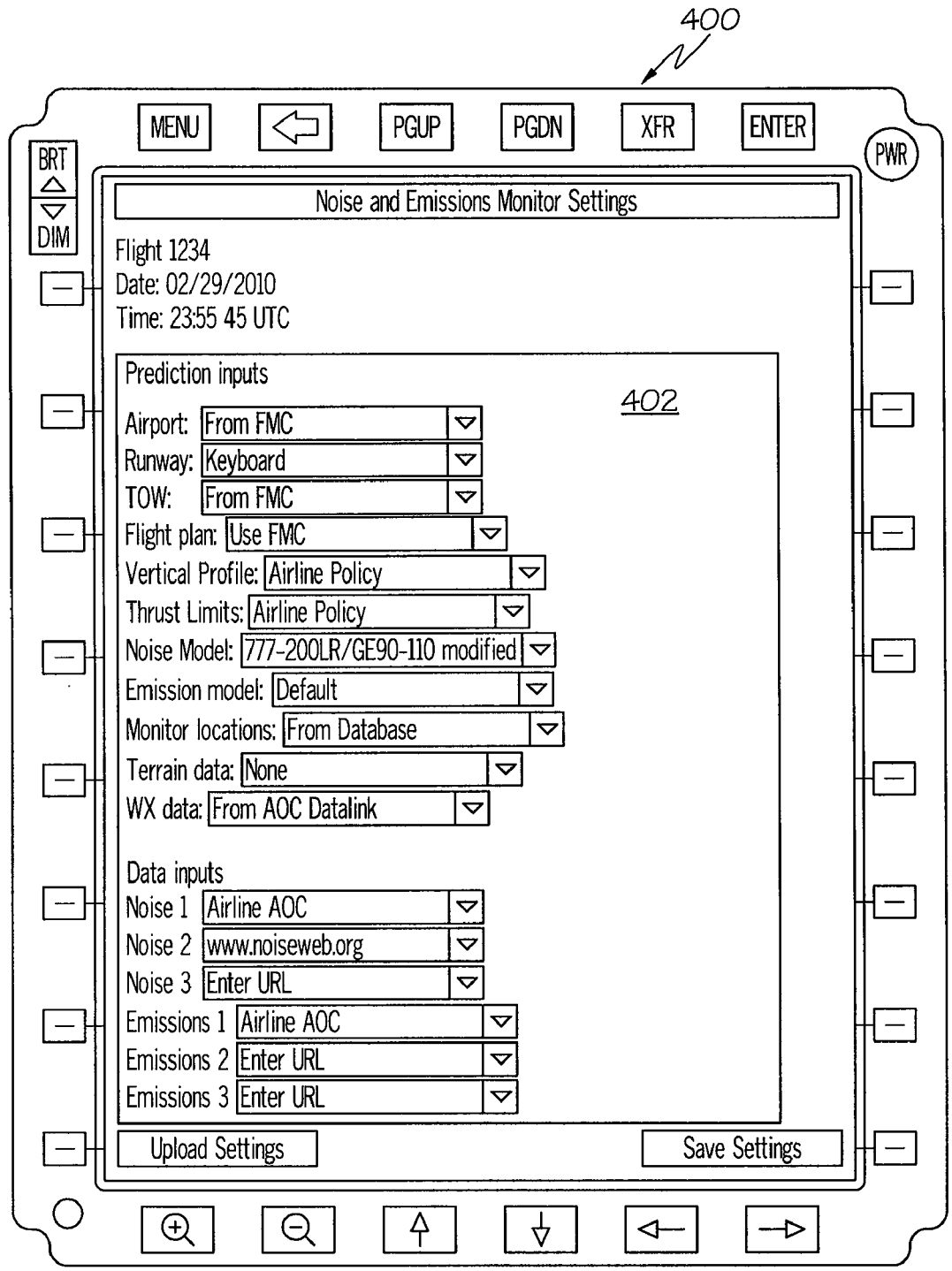
FIG. 4 is an illustration of the exemplary display presenting a setting page for entering or selecting different inputs or parameters by the pilot for use in the system in accordance with an embodiment of the present disclosure.

FIG. 4 is an illustration of the exemplary display 400 presenting a setting page 402 for entering or selecting different inputs or parameters by the pilot for use in the system in accordance with an embodiment of the present disclosure. The setting page 402 may permit a pilot to select different data sources, prediction models and other inputs or parameters for operation of the system for monitoring airplane noise and emissions. The setting page 402 may also permit access to the FMC data bus and other resources. A key feature may be the ability to upload settings from physical media, or by a wireless network.

Figure 5:
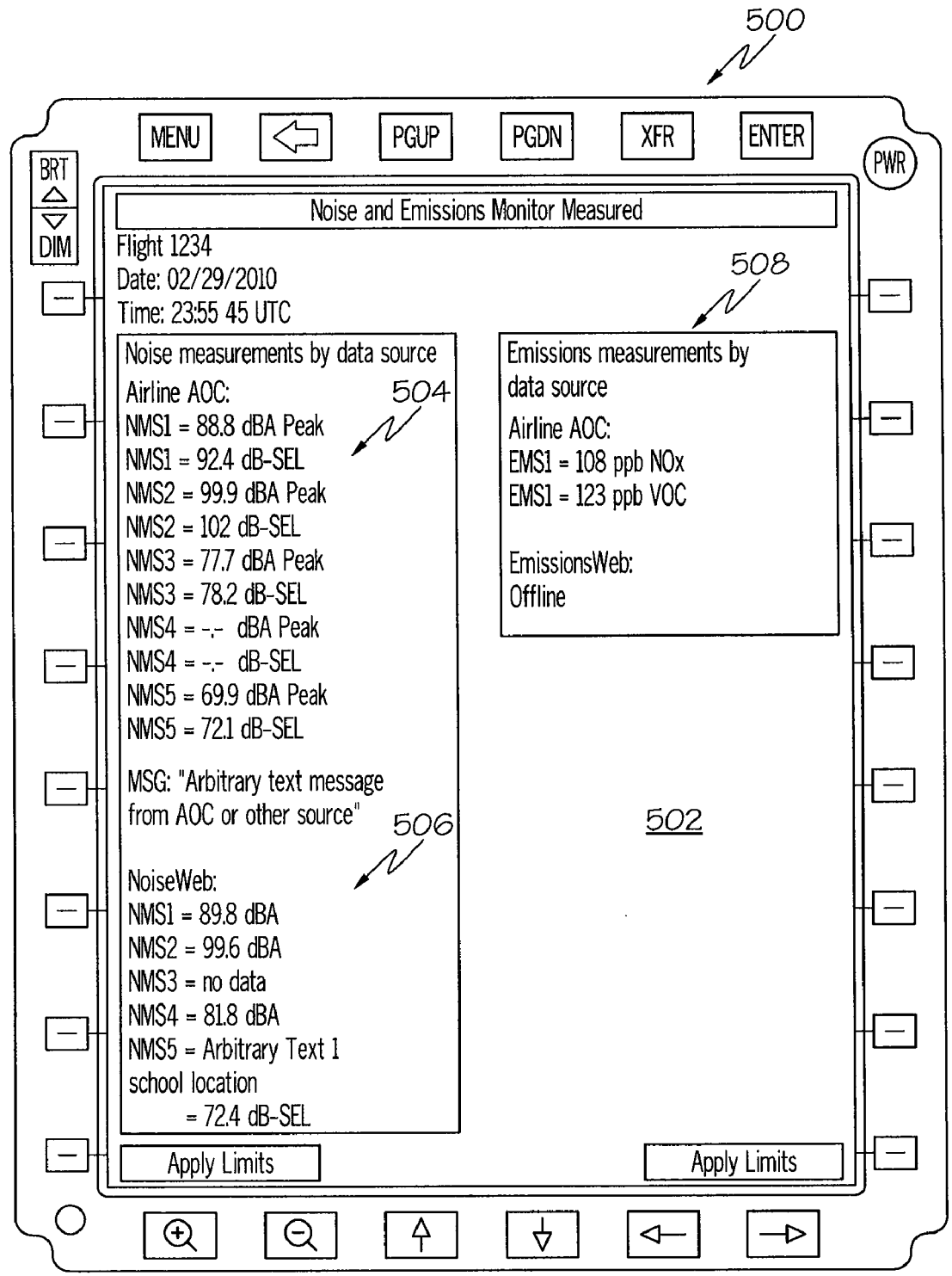
FIG. 5 is an illustration of the exemplary display presenting a measured noise and emissions reporting page in accordance with an embodiment of the present disclosure.

FIG. 5 is an illustration of the exemplary display 500 presenting a measured noise and emissions reporting page 502 in accordance with an embodiment of the present disclosure. The measured noise and emissions information may be presented to the pilot in a tabular format, similar to that illustrated in FIG. 5, or in another format, for example a graphical format, such as on a map similar to the map illustrated in FIG. 7. Each of the ground based noise and/or emissions monitoring stations may be identified by an identification, such as a name or number and the corresponding noise or emissions level for the monitoring station may be presented in association with the monitoring station identification. Any predicted levels or actual measured levels exceeding any preset limited may be identified or highlighted for easy recognition and awareness by the pilot for any corrective or mitigating actions that may be taken to reduce noise and emissions levels.

As illustrated in FIG. 5, the measured noise and emissions reporting page or pages may show the measured noise levels that may be reported in multiple noise metrics at multiple locations in a tabular format. Arbitrary text messages from a variety of sources may also be displayed Limits may be selectively applied to the measurements. The titles for the noise and emissions monitoring locations may be arbitrary names like NMS, EMS, Mic, arbitrary locations names, etc.

As further illustrated in FIG. 5 noise measurement data may be presented from different sources, such as for example from the Airline Aeronautical Operational Control (AOC) 504 and measurements from a web-based source 506. Emissions measurements may be presented in another table 508.

Figure 6:
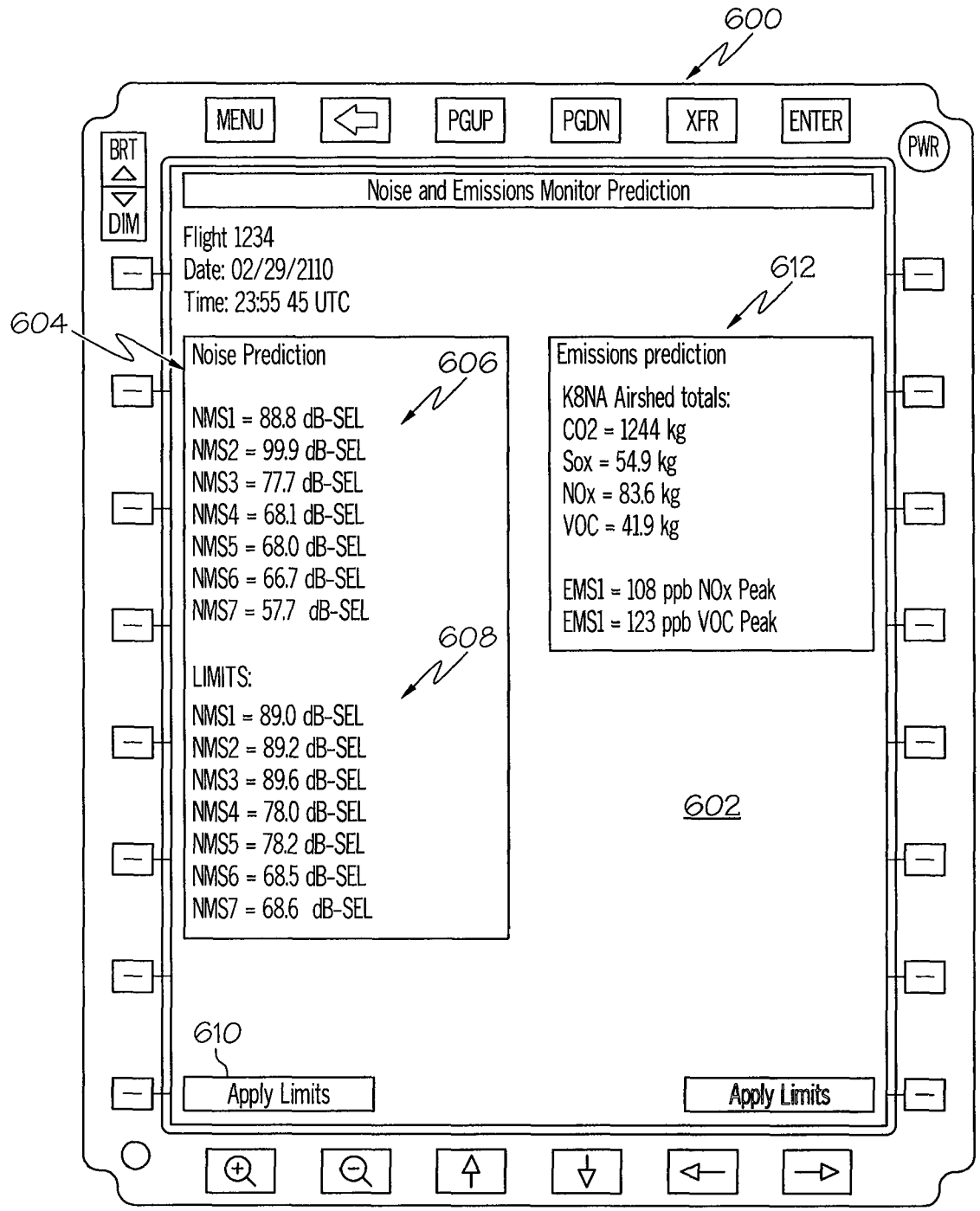
FIG. 6 is an illustration of the exemplary display presenting a predicted noise and emissions reporting in accordance with an embodiment of the present disclosure.

FIG. 6 is an illustration of the exemplary display 600 presenting a predicted noise and emissions reporting page 602 in accordance with an embodiment of the present disclosure. The predicted noise and emissions reporting page or pages may show predicted noise levels that may be reported in multiple noise metrics at multiple locations in a tabular format. The predicted noise levels and emissions levels may also be presented in other formats, such as a graphical format, on a map similar to map 702 in FIG. 7, or similar formats. Limits may be applied to the predictions. If limits are not available the selection may be grayed out. The titles for the noise and emissions monitoring locations may be arbitrary names like NMS, EMS, Mic, arbitrary locations names, etc. Accordingly, each of the ground based noise monitoring stations may be identified by an identification 604 which may be a name, number or combination thereof. The predicted noise level 606 is presented in association with the monitoring station identification 604. Preset limits 608 may be listed separately. An option 610 may be presented to apply the preset limits to the predictions 604. Any predicted noise levels 606 close to or exceeding the preset limit 608 for the monitoring station 604 may be distinguished or highlighted to provide enhanced environmental awareness of the pilot. For example, any predicted noise level 606 that exceeds the preset limit 608 for the monitoring station may be presented in the color red. Any predicted noise level 606 within a predetermined range of the preset limit 608 but below the preset limit 608 may be presented in the color yellow or orange, and any predicted noise level 606 below the predetermined range below the preset limit 608 for the monitoring station may be presented in the color green. Emissions predictions may be presented in a separate table 612 on the display 600.

Figure 7:
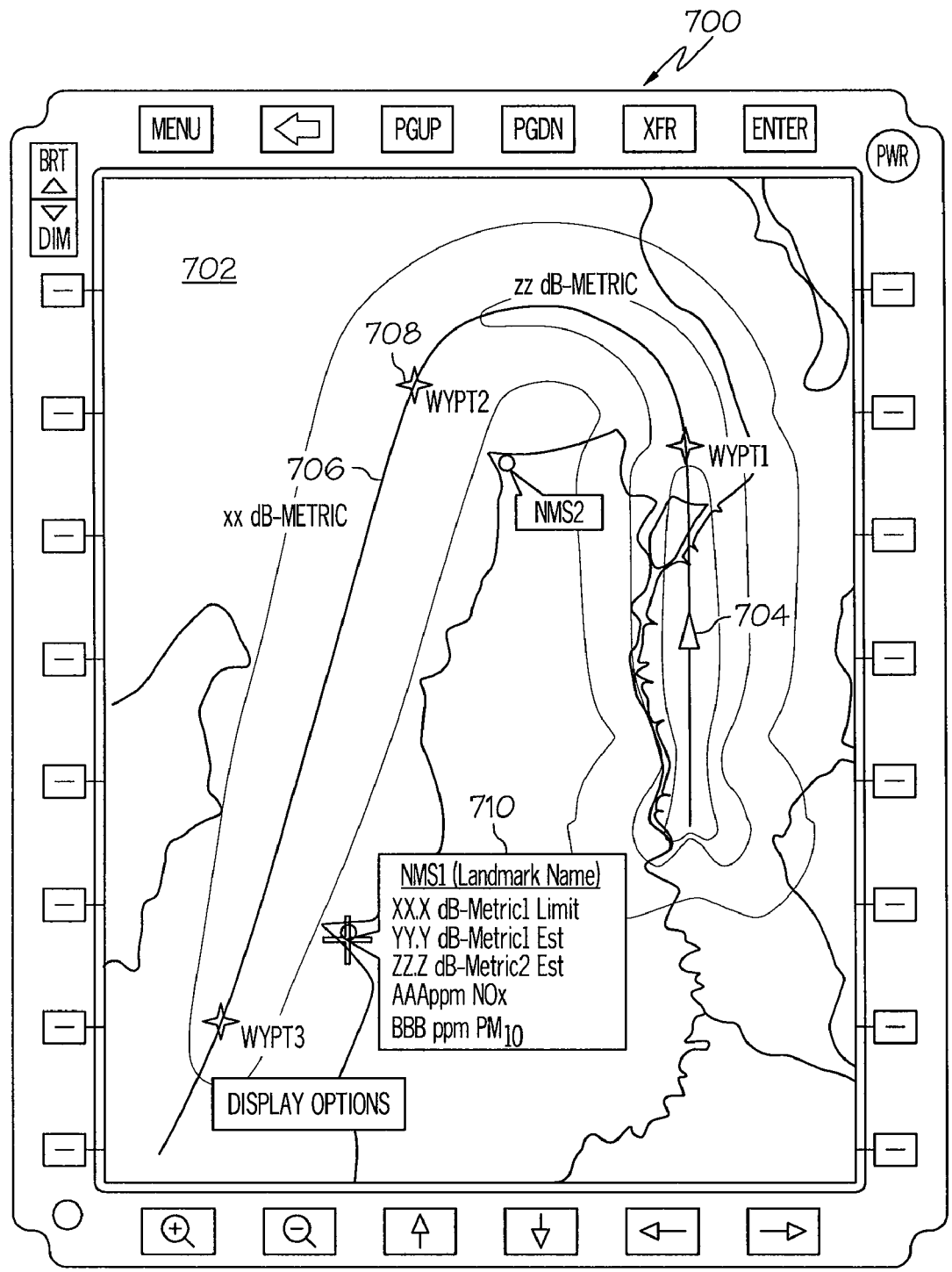
FIG. 7 is an illustration of the exemplary display presenting a map capable of selectively showing different ground based monitoring stations and associated noise and emissions data in accordance with an embodiment of the present disclosure.

FIG. 7 is an illustration of the exemplary display 700 presenting a map 702 capable of selectively showing different ground based monitoring stations and associated noise and emissions data in accordance with an embodiment of the present disclosure. The orientation and scale of the display 700 may be similar to a typical navigation display convention. The display may be alterable or may be controlled via display options or EFB soft keys, such as zoom, scroll or other options.

Other features presentable on the display 700 may include a self-ship triangle 704 or other symbol which may be similar to the self-ship on a conventional navigation display. The planned path 706 of the airplane may also be presented similar to navigation display convention. The planned path may be presented in a predetermined color, such as magenta to be easily observed by the pilot. Waypoints 708 may be presented in plan (black, magenta for next) similar to navigation display convention. Map elements such as roadways, terrain, waterways and other features may be presented to provide scale and location reference. Display elements may be selected by the EFB or other display pointing device/touch screen/tab or cursor navigation to select.

The display 700 may also selectively present multiple metrics of noise and emissions data from multiple sources (predicted and measured) at multiple locations. The noise and emissions data may be color-coded for rapid identification of problem locations (for example: red for over limit, orange for within tolerance of limit, green for under limit). Selecting a monitoring location with use of the touch screen or pointer may expand a location tag 710, similar to that illustrated in FIG. 7, to show more detail such as noise and emissions predictions, measurements, limits, location name or other arbitrary data.

Another feature of the display 700 may be to present either the noise or emissions levels in a graduation scale based on the noise or emission intensity field on a map similar to map 702. For example, noise or emissions in the highest level or levels that exceed a highest preset limit may be illustrated as a red shaded area on the map to provide environment awareness to the pilot. Noise or emissions in a next level or cautionary range may be illustrated on the map as a yellow or orange shaded area for an example. Noise and emissions levels in areas below a preset highest level or below the cautionary range just below the highest preset level may be illustrated by green shading on those areas of the map. Similar to that previously described a noise or emissions area intensity field may be estimated from a sufficiently large number of discrete noise or emission prediction or monitoring sites. Iso-contours of noise or emissions, commonly referred to as "footprints or contours" may be generated from the intensity field information and presented on the map. Discrete ground based noise and emissions monitoring stations and their respective noise or emission prediction may also be presented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A method for monitoring airplane noise and emissions, comprising:
 receiving a predetermined set of engine performance data for an airplane;
 receiving a predetermined set of airplane flight data for the airplane;
 predicting at least one of a noise level and an emissions level from the airplane at each of a plurality of ground based noise and emissions monitoring stations based on the predetermined set of engine performance data and the predetermined set of airplane flight data, wherein each of the plurality of ground based noise and emissions monitoring stations is located at a predetermined geographic location along an expected flight path of the airplane;

presenting an interface on a display to a pilot, wherein the interface comprises a feature for the pilot to select presentation of at least one of the predicted noise level, an actually measured noise level, the predicted emissions level, and an actually measured emissions level at each of the plurality of ground based noise and emissions monitoring stations in a format chosen by the pilot, the format comprising a graphical format and a tabular format; and presenting at least one of the predicted noise level and the predicted emissions level on the display to the pilot of the airplane to permit operation of the airplane to substantially minimize at least one of the actual noise level and the actual emissions level at each of the plurality of ground based noise and emissions monitoring stations.

2. The method of claim 1, further comprising:

receiving at least one of a real-time or near real-time actual measured noise level and a real-time or near real-time actual measured emissions level created by the airplane for each of the plurality of ground based noise and emissions monitoring stations as the airplane proceeds along an actual flight path; and presenting on the display at least one of the real-time or near real-time actual measured noise level and the real-time or near real-time actual measured emissions level for each of the plurality of ground based noise and emissions monitoring stations as the airplane proceeds along the actual flight path.

3. The method of claim 2, further comprising continually updating at least one of the real-time or near-real-time actual measured noise level and the real-time or near real-time actual measured emissions level for each of the plurality of ground based noise and emissions monitoring stations as the airplane proceeds along the actual flight path.

4. The method of claim 2, further comprising presenting a map on the display;

presenting each of the ground based noise and emissions monitoring stations in their respective geographical locations on the map; and presenting on the map in relation to each of the ground based noise and emissions monitoring stations, the selected one of or combination of the predicted noise level, the predicted emissions level, the real-time or near real time actual measured noise level, and the real-time or near real-time actual measured emissions level associated with each of the ground based noise and emissions monitoring stations.

5. The method of claim 4, further comprising representing a graduation of at least the actual measured noise level on the map.

6. The method of claim 2, further comprising:

comparing each of the predicted noise levels to at least one preset noise limit for each of the ground based noise and emissions monitoring stations in response to the pilot selecting an option to apply limits to the predicted noise levels;

identifying on the display any predicted noise level that exceeds the at least one preset noise limit in response to the pilot selecting the option to apply limits to the predicted noise levels;

comparing the real-time or near real-time actual measured noise levels to the at least one preset noise limit for each of the ground based noise and emissions monitoring stations in response to the pilot selecting the option to apply limits to the real-time or near real-time actual measured noise levels; and identifying on the display any real-time or near real-time actual measured noise level that exceeds the at least one preset noise limit in response to the pilot selecting the option to apply limits to the real-time or near real-time actual measured noise levels.

7. The method of claim 2, further comprising:

comparing each of the predicted emissions levels to at least one preset emissions limit for each of the ground based noise and emissions monitoring stations in response to the pilot selecting an option to apply limits to the predicted emissions levels;

identifying on the display any predicted emissions level that exceeds the at least one preset emissions limit in response to the pilot selecting the option to apply limits to the predicted emissions levels;

comparing the real-time or near real-time actual measured emissions levels to the at least one preset emissions limit for each of the ground based noise and emissions monitoring stations in response to the pilot selecting the option to apply limits to the real-time or near real-time actual measured emissions levels; and identifying on the display any real-time or near real-time actual measured emissions level that exceeds the at least one preset emissions limit in response to the pilot selecting the option to apply limits to the real-time or near real-time actual measured emissions levels.

8. The method of claim 2, further comprising at least one of:

storing at least one of the real-time or the near real-time actual measured noise levels and the actual measured emissions levels for each of the ground based noise and emissions monitoring station in a storage device onboard the airplane; and transmitting at least one of the real-time or the near real-time actual measured noise levels and the actual measured emissions levels for each of the ground based noise and emissions monitoring station to a ground station for storage in a external database.

9. The method of claim 1, further comprising receiving atmospheric and weather information for use in predicting at least one of the noise level and the emissions level from the airplane at each of the plurality of ground based noise and emissions monitoring stations.

10. The method of claim 1, further comprising transmitting at least one of the predicted noise level and emissions level from the airplane to a ground receiving station.

11. The method of claim 1, further comprising using at least one of a set of previous noise level and emissions level predictions and a set of previously measured actual noise levels and emissions levels to improve a capability of a model for predicting the noise level and to improve a capability of a model for predicting the emissions level.

12. The method of claim 1, further comprising selectively presenting on the display at least one of the predicted noise level, the actually measured noise level, the predicted emissions level, and the actually measured emissions level before, during and after the airplane traversing a geographic area defined by the plurality of ground based noise and emissions monitoring stations to provide feedback to the pilot or flight crew.

13. A system for monitoring airplane noise and emissions, comprising:

a computer system mountable on an airplane, the computer system being adapted to receive a predetermined set of engine performance data and a predetermined set of airplane flight data for the airplane, the computer system being further adapted to predict a noise level and an emissions level from the airplane at each of a plurality of ground based noise and emissions monitoring stations based on the predetermined set of engine performance data and the predetermined set of airplane flight data, wherein each of the plurality of ground based noise and emissions monitoring stations is located at a predetermined geographic location along an expected flight path of the airplane; and a display in a cockpit of the airplane;

an interface presentable on the display to a pilot, wherein the interface comprises a feature for the pilot to select presentation of at least one of the predicted noise level, an actually measured noise level, the predicted emissions level, and an actually measured emissions level at each of the plurality of ground based noise and emissions monitoring stations in a format chosen by the pilot, the format comprising a graphical format and a tabular format; and the display selectively presenting at least one of the predicted noise level and the predicted emissions level to the pilot of the airplane permits operation of the airplane to substantially minimize at least one of the actual noise level and the actual emissions level at each of the plurality of ground based noise and emissions monitoring stations.

14. The system of claim 13, further comprising a transceiver to receive at least one of a real-time or near real-time actual measured noise level and a real-time or near real-time actual measured emissions level created by the airplane for each of the plurality of ground based noise and emissions monitoring stations as the airplane proceeds along an actual flight path, wherein at least one of the real-time or near real-time actual measured noise level and the real-time or near real-time actual measured emissions level for each of the plurality of ground based noise and emissions monitoring stations is selectively presentable on the display as the airplane proceeds along the actual flight path.

15. The system of claim 13, wherein any noise level or emissions level exceeding a preset limit is distinguished from other noise levels or emissions levels on the display for easy recognition by the pilot.

16. A computer program product for monitoring airplane noise and emissions, the computer program product comprising:

a computer readable storage medium having computer readable program code embodied therewith, the computer readable program code comprising:

computer readable program code configured to receive a predetermined set of engine performance data for an airplane;

computer readable program code configured to receive a predetermined set of airplane flight data for the airplane;

computer readable program code configured to predict at least one of a noise level and an emissions level from the airplane at each of a plurality of ground based noise and emissions monitoring stations based on the predetermined set of engine performance data and the predetermined set of airplane flight data, wherein each of the plurality of ground based noise and emissions monitoring stations is located at a predetermined geographic location along an expected flight path of the airplane;

computer readable program code configured to present an interface on a display to a pilot, wherein the interface comprises a feature for the pilot to select presentation of at least one of the predicted noise level, an actually measured noise level, the predicted emissions level, and an actually measured emissions level at each of the plurality of ground based noise and emissions monitoring stations in a format chosen by the pilot, the format comprising a graphical format and a tabular format; and computer readable program code configured to present at least one of the predicted noise level and the predicted emissions level on the display to the pilot of the airplane to permit operation of the airplane to substantially minimize at least one of the actual noise level and the actual emissions level at each of the plurality of ground based noise and emissions monitoring stations.

17. The computer program product of claim 16, further comprising:

computer readable program code configured to receive at least one of a real-time or near real-time actual measured noise level and a real-time or near real-time actual measured emissions level created by the airplane for each of the plurality of ground based noise and emissions monitoring stations as the airplane proceeds along an actual flight path; and computer readable program code configured to selectively present on the display at least one of the real-time or near real-time actual measured noise level and the real-time or near real-time actual measured emissions level for each of the plurality of ground based noise and emissions monitoring stations as the airplane proceeds along the actual flight path.

\* \* \* \* \*